United States Patent
Rademann et al.

(10) Patent No.: US 11,479,570 B2
(45) Date of Patent: Oct. 25, 2022

(54) PENTAFLUOROPHOSPHATE DERIVATIVE, ITS USES AND AN APPROPRIATE MANUFACTURING METHOD

(71) Applicant: FREIE UNIVERSITÄT BERLIN, Berlin (DE)

(72) Inventors: Jörg Rademann, Berlin (DE); Stefan Wagner, Berlin (DE); Matteo Accorsi, Berlin (DE)

(73) Assignee: FREIE UNIVERSITÄT BERLIN, Berlin (DE)

( * ) Notice: Subject to any disclaimer, the term of this patent is extended or adjusted under 35 U.S.C. 154(b) by 309 days.

(21) Appl. No.: 16/647,334

(22) PCT Filed: Sep. 13, 2018

(86) PCT No.: PCT/EP2018/074803
§ 371 (c)(1),
(2) Date: Mar. 13, 2020

(87) PCT Pub. No.: WO2019/053158
PCT Pub. Date: Mar. 21, 2019

(65) Prior Publication Data
US 2021/0122772 A1 Apr. 29, 2021

(30) Foreign Application Priority Data
Sep. 13, 2017 (EP) ..................................... 17190937

(51) Int. Cl.
C07F 9/535 (2006.01)
C07F 9/02 (2006.01)

(52) U.S. Cl.
CPC .............. C07F 9/535 (2013.01); C07F 9/025 (2013.01)

(58) Field of Classification Search
CPC .................................. C07F 9/535; C07F 9/025
USPC ......................................................... 560/30
See application file for complete search history.

(56) References Cited

U.S. PATENT DOCUMENTS 3,300,503 A * 1/1967 Schmutzler ............. C07F 9/062
987/188
2012/0270116 A1 10/2012 Cho

FOREIGN PATENT DOCUMENTS

EP 1885717 B1 8/2011
WO 2005/105815 A1 11/2005
WO 2006/055525 A2 5/2006
WO 2012041524 A1 4/2012
WO 2016/074757 A1 5/2016

OTHER PUBLICATIONS

Burke T. R. et al. "Preparation of fluoro-and hydroxy-4-(phosphonomethyl)-D, Lphenylalanine suitably protected for solid-phase synthesis of peptides containing hydrolytically stable analogs of O-phosphotyrosine." The Journal of Organic Chemistry 58.6 (Mar. 1, 1993): 1336-1340.
Marseigne, I. and B.P. Roques. "Synthesis of new amino acids mimicking sulfated and phosphorylated tyrosine residues." The Journal of Organic Chemistry 53.15 (Jul. 1, 1988): 3621-3624.
Kole, H. K., et al. "Phosphonate inhibitors of protein-tyrosine and serine/threonine phosphatases." Biochemical Journal 311.3 (Nov. 1, 1995): 1025-1031.
Smyth M.S. et al. "A General Method for the Preparation of Benzylic α,α-Difluorophosphonic Acids; Non-Hydrolyzable Mimetics of Phosphotyrosine," Tetrahedron Letters, Jul. 14, 1992, 33, 4137-4140.
Burke, T. R. et al. "Small Molecule Interactions with Protein-Tyrosine Phosphatase PTP1B and Their Use in Inhibitor Design." Biochemistry Dec. 17, 1996, 35, 15989-15996.
Database Caplus [Online] Chemical Abstracts Service, Columbus, Ohio, US; Apr. 7, 2017 (Apr. 27, 2017), XP002778172, retrieved from STN Database accession No. 2017:660216.

(Continued)

*Primary Examiner* — Kristin A Vajda
(74) *Attorney, Agent, or Firm* — Maschoff Brennan (57) ABSTRACT

It is provided a pentafluorophosphate derivative according to general formula (I):

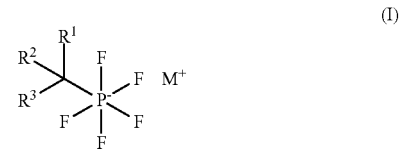

or a pharmaceutically acceptable salt or solvate thereof. Thereby, $R^1$ and $R^2$ denote independently from each other H or F; $R^3$ denotes H, a $C_1$-$C_{10}$ alkyl optionally substituted by a hydrocarbon chain comprising an amide function and/or a carboxyl function, or by a substituent chosen from the group consisting of alkyl, alkylamino, alkylaminocarboxy, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo, an optionally substituted $C_3$-$C_{10}$ cycloalkyl, or an optionally substituted $C_6$-$C_{20}$ aryl, wherein a hydrocarbon chain of the alkyl, the cycloalkyl or the aryl can be interrupted by one or more oxygen, sulfur and/or nitrogen atoms; and M denotes any cation; with the proviso that at least one of $R^1$ and $R^2$ denotes F, if $R^3$ denotes H.

11 Claims, 4 Drawing Sheets

(56) References Cited

OTHER PUBLICATIONS

Database Caplus [Online] Chemical Abstracts Service, Columbus, Ohio, US; Dec. 7, 2017 (Dec. 7, 2017), XP002778173, retrieved from STN Database accession No. 2017:1920901.
Database Caplus [Online] Chemical Abstracts Service, Columbus, Ohio, US; Jul. 6, 2017 (Jul. 6, 2017), XP002778174, retrieved from STN Database accession No. 2017:1123606.

* cited by examiner

PENTAFLUOROPHOSPHATE DERIVATIVE, ITS USES AND AN APPROPRIATE MANUFACTURING METHOD

CROSS-REFERENCE TO A RELATED APPLICATION

This application is a National Phase Patent Application of International Patent Application Number PCT/EP2018/074803, filed on Sep. 13, 2018, which claims priority of European Patent Application Number 17 190 937.7, filed on Sep. 13, 2017.

BACKGROUND

The disclosure relates to a pentafluorophosphate derivative, to a pharmaceutical composition and to a method for manufacturing a pentafluorophosphate derivative.

Phosphorylation and dephosphorylation of proteins at serine, threonine and tyrosine residues is a major natural mechanism of activation or deactivation of biomacromolecules. Not surprisingly, protein tyrosine, serine and threonine phosphatases have been postulated as valuable pharmacological targets. However, no phosphatase inhibitors have been admitted as drugs for clinical use so far. For these reasons, novel chemical tools for the detection and modulation of phosphatase activity still are in high demand.

Most protein tyrosine phosphatase (PTP) inhibitors compete with the phosphate substrate for the active site of the enzymes and thus contain phosphate bioisosters, which can be developed to highly specific inhibitors by extension with fragments targeting specific secondary binding sites. Bioisosters of the phosphotyrosine residue include benzyl phosphonates, difluorobenzyl phosphonates, sulfonates, triflylamides, carboxylic acids, and isothiazolidinones.

Recently, benzoyl phosphonates were discovered as photoactivated phosphotyrosine bioisosters and have been used for the specific deactivation and covalent labeling of phosphotyrosine recognition domains and photo-deactivation of PTP. In addition, the development of covalent modifiers targeting the active sites of PTPs as "activity-based probes" has been pursued.

SUMMARY

It is an object underlying the proposed solution to provide novel protein tyrosine phosphatase inhibitors. This object is achieved with a pentafluorophosphate derivative having features as described herein. Such a pentafluorophosphate derivative corresponds to general formula (I) or is a pharmaceutically acceptable salt or solvate thereof:

(I)

Thereby, the residues have the following meaning:
$R^1$ and $R^2$ denote independently from each other H or F,
$R^3$ denotes H,
a $C_1$-$C_{10}$ alkyl optionally substituted by a hydrocarbon chain comprising an amide function and/or a carboxyl function, or by a substituent chosen from the group consisting of alkyl, alkylamino, alkylaminocarboxy, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo,
an optionally substituted $C_3$-$C_{10}$ cycloalkyl, or
an optionally substituted $C_6$-$C_{20}$ aryl,
wherein a hydrocarbon chain of the alkyl, the cycloalkyl or the aryl can be interrupted by one or more oxygen, sulfur and/or nitrogen atoms, and
M denotes any cation.

The residues can have these meanings with the proviso that at least one of $R^1$ and $R^2$ denotes F, if $R^3$ denotes H.

Surprisingly, pentafluorophosphate derivatives according to the preceding explanations show better binding properties and inhibition properties of a model protein tyrosine phosphatase, namely, of protein tyrosine phosphatase 1B (PTP1B) than the currently used gold standard, and at the same time have a higher stability than already known protein tyrosine phosphatase inhibitors.

Preliminary experimental data suggests that due to the decreased negative charge at the phosphor atom the novel pentafluorophosphate exhibit lower hydrophilic properties and an increased cell penetration ability than protein tyrosine phosphatase inhibitors known from prior art. These superior properties enable a delivery of the novel pentafluorophosphate derivatives to the site of action within cells.

Alkyl chains that are interrupted by one or more oxygen, sulfur and/or nitrogen atoms can also be denoted as hetalkyl. Likewise, cycloalkyl chains that are interrupted by one or more oxygen, sulfur and/or nitrogen atoms can also be denoted as hetcycloalkyl. Likewise, aryl chains that are interrupted by one or more oxygen, sulfur and/or nitrogen atoms can also be denoted as hetaryl.

In an embodiment, the alkyl of residue $R^3$ is substituted by both an amide function and carboxyl function. This embodiment encompasses amino acid derivatives comprising the pentafluorophosphate moiety of general formula (I). Such a molecular structure enables good interactions between the pentafluorophosphate derivative and the active site of a protein tyrosine phosphatase so that the inhibition properties of the corresponding pentafluorophosphate derivative with respect to protein tyrosine phosphatases can be exploited in a particular appropriate way.

In an embodiment, the alkyl is a $C_2$-$C_9$ alkyl, in particular a $C_3$-$C_8$ alkyl, in particular a $C_4$-$C_7$ alkyl, in particular a $C_5$-$C_6$ alkyl.

In an embodiment, the cycloalkyl is a $C_4$-$C_9$ cycloalkyl, in particular a $C_5$-$C_8$ cycloalkyl, in particular a $C_6$-$C_7$ cycloalkyl.

In an embodiment, the aryl is a $C_7$-$C_{19}$ aryl, in particular a $C_8$-$C_{18}$ aryl, in particular a $C_9$-$C_{17}$ aryl, in particular a $C_{10}$-$C_{16}$ aryl, in particular a $C_{11}$-$C_{15}$ aryl, in particular a $C_{12}$-$C_{14}$ aryl, in particular a $C_{13}$-$C_{14}$ aryl.

In an embodiment, the cycloalkyl or the aryl of residue $R^3$ is substituted by a hydrocarbon chain comprising an amide function and/or a carboxyl function. Thereby, this embodiment particularly relates to a substitution by both an amide function and carboxyl function. This embodiment encompasses amino acid derivatives comprising the pentafluorophosphate moiety of general formula (I). Such a molecular structure enables good interactions between the pentafluorophosphate derivative and the active site of a protein tyrosine phosphatase so that the inhibition properties of the corresponding pentafluorophosphate derivative with respect to protein tyrosine phosphatases can be exploited in a particular appropriate way.

In an embodiment, the cycloalkyl or the aryl of residue $R^3$ is substituted by a substituent that is chosen from the group consisting of alkyl, alkylamino, alkylaminocarboxy, halogen, haloalkyl, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo. Thereby, it is possible that more than one substituent is present in the same molecule. The individual substituents can have a different chemical structure. It is also possible that two or more substituents of the same chemical structure are present in the same molecule.

In an embodiment, the cation is at least one chosen from the group consisting of quaternary ammonium ions such as alkyltrimethylammonium ions, dialkyldimethylammonium ions, and in particular tetramethylammonium ions, as well as alkaline metal ions such as sodium ions and potassium ions.

In an embodiment, the pentafluorophosphate derivative corresponds to general formula (II) or is a pharmaceutically acceptable salt or solvate thereof:

(II)

Thereby, $R^4$, $R^5$, $R^6$, $R^7$, $R^8$ denote independently from each other H, an optionally substituted $C_1$-$C_{10}$ alkyl, an optionally substituted $C_3$-$C_{10}$ cycloalkyl, or an optionally substituted $C_6$-$C_{20}$ aryl, wherein a hydrocarbon chain of the alkyl, the cycloalkyl or the aryl can be interrupted by one or more oxygen, sulfur and/or nitrogen atoms.

In an embodiment, the alkyl, the cycloalkyl or the aryl of residue $R^4$, $R^5$, $R^6$, $R^7$, and/or $R^8$ is substituted by a hydrocarbon chain comprising an amide function and/or a carboxyl function. Thereby, this embodiment particularly relates to a substitution by both an amide function and carboxyl function. This embodiment encompasses amino acid derivatives comprising the pentafluorophosphate moiety of general formula (I). Such a molecular structure enables good interactions between the pentafluorophosphate derivative and the active site of a protein tyrosine phosphatase so that the inhibition properties of the corresponding pentafluorophosphate derivative with respect to protein tyrosine phosphatases can be exploited in a particular appropriate way.

In an embodiment, the alkyl, the cycloalkyl or the aryl of residue $R^4$, $R^5$, $R^6$, $R^7$, and/or $R^8$ is substituted by a substituent that is chosen from the group consisting of alkyl, alkylamino, alkylaminocarboxy, halogen, haloalkyl, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo. Thereby, it is possible that more than one substituent is present in the same molecule. The individual substituents can have a different chemical structure. It is also possible that two or more substituents of the same chemical structure are present in the same molecule.

In an embodiment, the pentafluorophosphate derivative corresponds to general formula (III) or is a pharmaceutically acceptable salt or solvate thereof:

(III)

Thereby, $R^9$ denotes H or is a protective group. Benzyl carbamate, phthalimide, benzylideneamine, 9-fluorenylmethyl carbamate (Fmoc), acetamide, benzylamine, p-toluenesulfonamide, t-butyl carbamate, trifluoroacetamide, and triphenylmethylamine are appropriate protective groups. Thereby, Fmoc is a particular appropriate protective group.

In an embodiment, both $R^1$ and $R^2$ denote F. In such a case, the pentafluorophosphate comprises a $CF_2$ bridge. Preliminary data suggests that such a substitution motif increases the inhibition properties of the pentafluorophosphate derivative with respect to protein tyrosine phosphatases.

In an embodiment, both $R^1$ and $R^2$ denote F, and $R^3$ denotes H. Then, a pentafluorophosphate derivative corresponds to general formula (VI):

(VI)

This compound is a particularly appropriate building block for chemical syntheses of pentafluorophosphate derivatives according to general formula (I).

In an aspect, the solution relates to the first medical use of the presently described pentafluorophosphate derivatives. Since the pentafluorophosphate derivatives according to the present disclosure are considered to penetrate cells much better than compounds known from prior art, these pentafluorophosphate derivatives are particularly appropriate to be used as medicaments for treating any diseases or conditions in which an inhibition of a protein tyrosine phosphatase or the inhibition of phosphotyrosine recognition sites of proteins like in SH2 domains is desired or intended.

In an aspect, the solution relates to the further medical use of the presently described pentafluorophosphate derivatives for treating diabetes, adiposity, or cancer. These diseases are typically connected with protein tyrosine phosphatase activity that should be inhibited in order to ameliorate the health status of the respective individual.

In an aspect, the solution relates to the use of the described pentafluorophosphate derivatives for in vitro inhibiting protein tyrosine phosphatase. Such in vitro inhibiting is helpful in setting up assays or evaluating the inhibition power of different pentafluorophosphate derivatives.

In an aspect, the solution relates to a medical method for treating a human or an animal in need thereof by administering a pentafluorophosphate derivative according to the preceding explanations or a medicament and comprising such a pentafluorophosphate derivative as active ingredient. Thereby, the treatment relates, in an embodiment, to the treatment of a disease or condition in which an inhibition of a protein tyrosine phosphatase is intended or desired.

In an embodiment, the treated animal is a non-human mammal, in particular a rodent.

In an embodiment, the disease or condition to be treated is at least one of the group consisting of adiposity, diabetes, and cancer.

In an aspect, the solution relates to an in vitro method of inhibiting protein tyrosine phosphatase by a pentafluorophosphate derivative as described herein above. Such an in vitro method can comprise cell culture experiments.

In an aspect, the present solution relates to a pharmaceutical composition comprising a pentafluorophosphate derivative according to the preceding explanations as active compound.

Such pharmaceutical composition can be used for treating any disease or condition in which an inhibition of protein tyrosine phosphatase activity is desired, such as adiposity, diabetes or cancer.

In an aspect, the solution relates to a method for manufacturing a pentafluorophosphate derivative according to the preceding explanations. This method comprises the steps explained in the following.

In a first step, a diethyl phosphonate derivative according to general formula (IV) is converted into a sodium phosphonate derivative according to general formula (V). In a second step, the obtained sodium phosphonate derivative according to general formula (V) is fluorinated to obtain the pentafluorophosphate derivative according to general formula (I):

Thereby, $R^1$ and $R^2$ denote independent from each other H or F, $R^3$ denotes H, a $C_1$-$C_{10}$ alkyl optionally substituted by a hydrocarbon chain comprising an amide function and/or a carboxyl function, or by a substituent chosen from the group consisting of alkyl, alkylamino, alkylaminocarboxy, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo, an optionally substituted $C_3$-$C_{10}$ cycloalkyl, or an optionally substituted $C_6$-$C_{20}$ aryl, wherein a hydrocarbon chain of the alkyl, the cycloalkyl or the aryl can be interrupted by one or more oxygen, sulfur and/or nitrogen atoms, and M denotes any cation.

The residues can have these meanings with the proviso that at least one of $R^1$ and $R^2$ denotes F, if $R^3$ denotes H.

In an embodiment, the first step of the method is carried out by reacting the diethyl phosphonate derivative with bromotrimethylsilane in an organic solvent and by purifying the resulting product with an ion-exchange resin. A sodium-exchange resin, such as an Amberlite sodium resin can well be used as ion-exchange resin.

In an embodiment, the second step of the method is carried out by reacting the product resulting from the first step with oxalyl chloride and by fluorinating the resulting product with a fluorinating reagent.

In an embodiment, the fluorinating reagent is chosen from the group consisting of quaternary ammonium fluorides, alkali metal fluorides All embodiments of the described pentafluorophosphate derivative, the described uses, the described pharmaceutical composition, and the described methods can be combined in any desired way and can be transferred to the respective other of the described pentafluorophosphate derivative, the described uses, the described pharmaceutical composition, and the described methods.

BRIEF DESCRIPTION OF THE DRAWINGS

Aspects of the proposed solution will be explained in more detail in the following, making reference to exemplary embodiment and accompanying Figures.

DETAILED DESCRIPTION

Synthesis of tetramethylammonium N-(9H-Fluoren-9-ylmethoxycarbonyl)-4-(pentafluorophosphato-difluoromethyl)-(L)-phenylalanine methyl ester 7 as First Exemplary Pentafluorophosphate Derivative Tetramethylammonium N-(9H-Fluoren-9-ylmethoxycarbonyl)-4-(pentafluorophosphato-difluoromethyl)-(L)-phenylalanine methyl ester having a structure according to general formula (VII) was synthesized starting from 2-amino-3-phenyl propanoic acid 1.

(VII)

Figure 1:
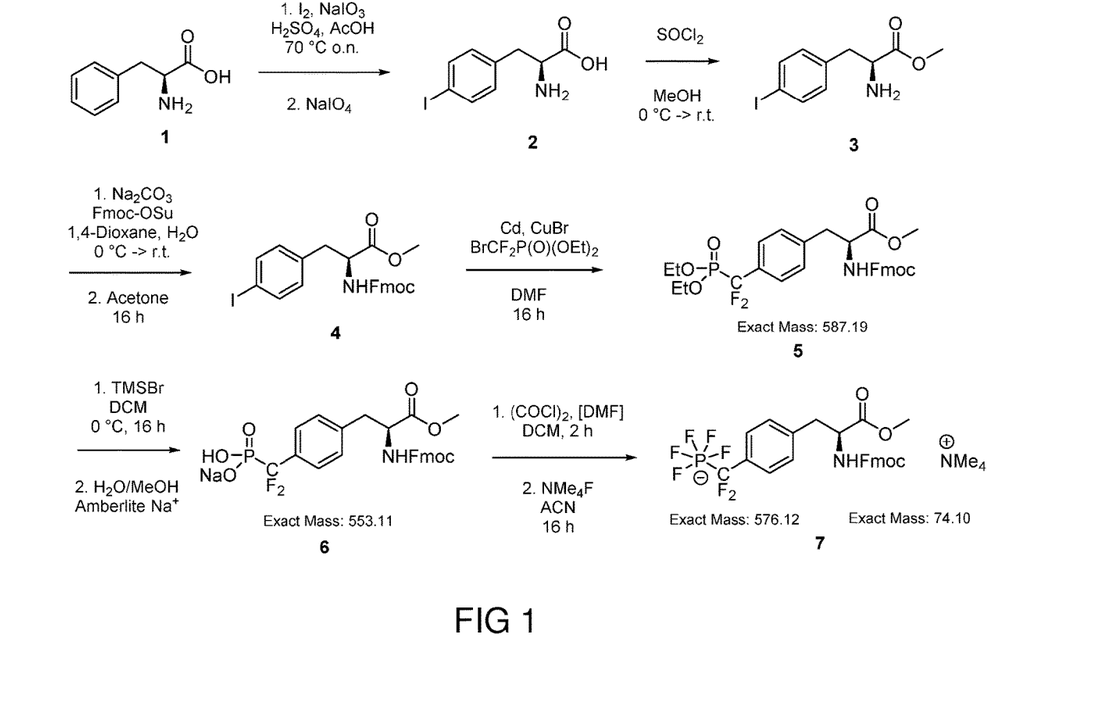
FIG. 1 shows a first reaction scheme illustrating a synthesis route for a first exemplary pentafluorophosphate derivative.

The synthesis route is illustrated in FIG. 1. Since its first steps are standard reactions that are fully understandable for a person skilled in the art from FIG. 1, they will not be explained in detail here. Rather, only the last two reaction steps (starting with compound 5) will now be explained in more detail.

N-(9H-Fluoren-9-ylmethoxycarbonyl)-4-(di-O-ethyl-phosphono-difluoromethyl)-(L)-phenylalanine methyl ester) 5 (320 mg, 0.54 mmol, 1 equivalents (eq.)) was dissolved in dry dichloromethane (DCM) (2.5 mL) under inert gas atmosphere. The solution was cooled to 0° C. and bromotrimethylsilane (TMSBr) (1.1 mL, 8.17 mmol, 15 eq.) was added dropwise via syringe. After complete addition stirring of the mixture was continued over night while reaching room temperature. Volatile components were removed in vacuo and the residue was taken up in a MeOH/H$_2$O (9:1) mixture with Amberlite Na$^+$-resin (1 g) and stirred for 2 h. Generally, this step could be omitted. The reaction was monitored via liquid chromatography/mass spectrometry (LC/MS). The resin beads were removed by filtration and the filtrate lyophilized to obtain sodium N-(9H-Fluoren-9-ylmethoxycarbonyl)-4-(phosphonato-difluoromethyl)-(L)-phenylalanine methyl ester 6 as a white solid (277.2 mg, 93%).

The resulting solid was used in the next step without further purification.

The phosphonate 6 (40 mg, 70 μmol, 1 eq.) from the previous step was suspended in dry DCM (1 mL) and a catalytic amount of dry dimethyl formamide (DMF) was added. Oxalylchloride (15 μL, 0.17 mmol, 2.5 eq.) was added dropwise at 0° C. and the reaction mixture was stirred at room temperature for 2 h while turning to a pale yellow suspension. Volatile components were removed under a stream of nitrogen and in vacuo to obtain a yellow residue which was then dissolved in dry acetonitrile (ACN) (2 mL). Tetramethylammonium fluoride (NMe$_4$F) (27 mg, 0.29 mmol, 4.1 eq.), carefully dried in vacuo, was added to the reaction solution and stirred for 16 h under inert atmosphere. After filtration of the precipitate, the filtrate was dried under reduced pressure, obtaining a yellowish residue.

According to $^{19}$F-NMR, tetramethylammonium N-(9H-Fluoren-9-ylmethoxycarbonyl)-4-(pentafluorophosphato-difluoromethyl)-(L)-phenylalanine methyl ester 7 was obtained as product with an impurity of 2%.

The raw product was purified in a reversed phase chromatography column (45% ACN/H$_2$O). The product-containing fractions were lyophilized yielding the product as a white solid.

Yield: 18 mg $^1$H NMR (700 MHz, [D6]DMSO): δ=7.90 (t, J=8.8 Hz, 2H, Ar—H), 7.67 (dd, J=20.0, J=7.5 Hz, 2H, Ar—H), 7.42 (q, J=7.4 Hz, 2H, Ar—H), 7.32 (dt, J=15.9, J=7.8 Hz, 2H, Ar—H), 7.26 (d, J=7.8 Hz, 2H), 7.19 (d, J=8.0 Hz, 2H), 4.26 (d, J=7.1 Hz, 2H, CH$_2$-Fmoc), 4.23-4.19 (m, 2H, CHN, CH-Fmoc), 3.04 (dd, J=13.8, J=4.8 Hz, 1H, CH$_α$Phe), 2.92 (dd, J=13.8, J=10.2 Hz, 1H, CH$_β$Phe) ppm; $^{13}$C NMR (176 MHz, [D6]DMSO): δ=172.8 (C═O), 156.4 (C═O Fmoc), 144.2, 144.2, 141.1, 137.4 (6× Ar—C), 128.3, 128.1, 127.5, 125.7, 120.5 (12× Ar—H), 66.1 (CH$_2$-Fmoc), 55.9 (CHN), 54.9 (NMe$_4$), 52.4 (OMe), 47.02 (CHFmoc), 36.48 (CH$_2$Phe) ppm; $^{19}$F (376 MHz, [D6]DMSO) δ=-70.5 (dp, J=704.7 Hz, J=43.2 Hz, 1F, F$_{ax}$), -72.1 (ddt, J=855.8 Hz, J=43.4 Hz, J=7.9 Hz, 4F, F$_{eq}$), -98.59 (dt, J=120.8 Hz, J=10.2 Hz, 2F, CF$_2$) ppm; $^{31}$P NMR (162 MHz, ACN) δ=-144.4 (dtquin, J=860.9, Hz, J=698.7, J=119.2 Hz) ppm; ESI-HRMS: [M]-calculated for C$_{26}$H$_{22}$F$_7$NO$_4$P$^−$: 576.11802, found: 576.11813 m/z.

Figure 2:
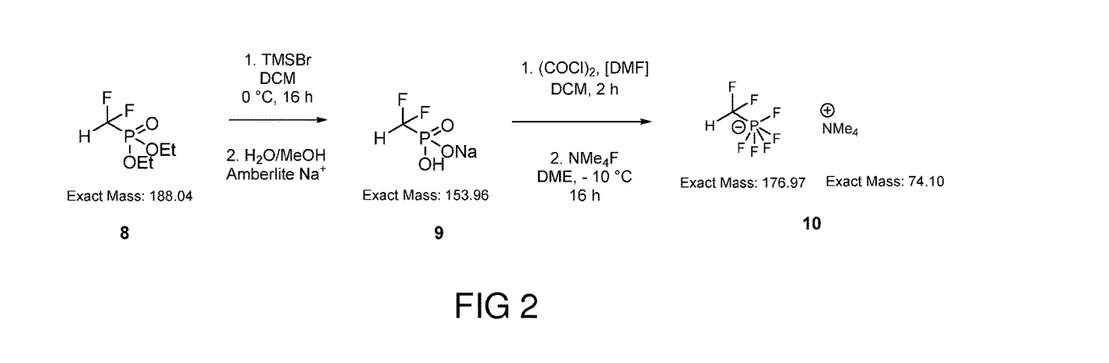
FIG. 2 shows a second reaction scheme illustrating a synthesis route for a second exemplary pentafluorophosphate derivative.

Synthesis of (difluoromethyl)pentafluorophosphate(V) 10 as Second Exemplary Pentafluorophosphate Derivative The synthesis route for this pentafluorophosphate derivative is illustrated in FIG. 2.

Diethyl (difluoromethyl)phosphonate 8 (100 mg, 0.53 mmol, 1 eq.) was dissolved in dry DCM (1 mL) under inert gas atmosphere. The solution was cooled to 0° C. and TMSBr (0.82 mL, 7.95 mmol, 15 eq.) was added dropwise via syringe. After complete addition stirring of the mixture was continued over night while reaching room temperature. Volatile components were removed in vacuo and the residue was taken up in a MeOH/H$_2$O (9:1) mixture with Amberlite Na$^+$-resin (1 g) and stirred for 2 h. The reaction was monitored via LC/MS. The resin beads were removed by filtration and the filtrate lyophilized to obtain sodium hydrogen (difluoromethyl)phosphonate 9 as a white solid (80 mg, 98%).

The resulting solid was used in the next step without further purification. The phosphonate 9 (80 mg, 0.52 mmol, 1 eq.) from the previous step was suspended in dry DCM (1 mL) and a catalytic amount of dry DMF was added. Oxalylchloride (111 μL, 1.30 mmol, 2.5 eq.) was added dropwise at 0° C. and the reaction mixture was stirred at room temperature for 2 h while turning to a yellow solution. Volatile components were removed in vacuo and the residue was then suspended in dry dimethyl ether (DME) (2 mL) and cooled to -10° C. NMe$_4$F (198 mg, 2.13 mmol, 4.1 eq.), carefully dried in vacuo, was added to the reaction mixture and stirred for 16 h under inert atmosphere while reaching room temperature. After filtration of the precipitate, the filtrate was dried under reduced pressure, obtaining 71.7 mg (55%) of a yellowish oily solid.

According to $^{19}$F-NMR, the product was obtained in a ratio of 1:0.7:0.5 (CHF$_7$P$^−$:CH$_2$F$_2$O$_3$P$^−$:CHF$_3$O$_2$P$^−$)

The raw product was extracted with hot DME (3×4 mL) and the solution reduced to about 4 mL and stored at -25° C. overnight but no crystals could be obtained. The residue after extraction was recrystallized from hot ACN to obtain a precipitation which was identified by mass to be the product.

$^1$H (500 MHz, [D6]DMSO): δ=3.11 (s, 12H), 5.72-5.95 (m, 1H) ppm; $^{19}$F (400 MHz, [D6]DMSO): δ=-71.27 (dp, J=709.8 Hz, J=43.9 Hz, 1F, F$_{ax}$), -75.22 (dd, J=826.65 Hz, J=43.7 Hz, 4F, F$_{eq}$), -127.56 (m, 2F, CF$_2$) ppm; $^{31}$P (162 MHz, [D6]DMSO): δ=-144.77 (dtquin, J=832 Hz, J=712 Hz, J=99 Hz) ppm.

Figure 3:
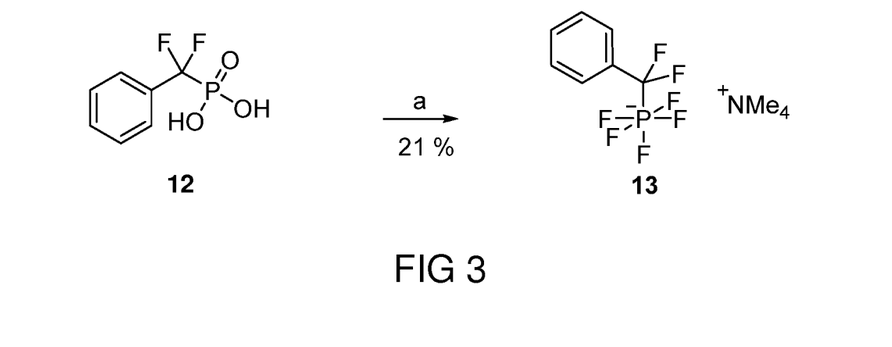
FIG. 3 shows a third reaction scheme illustrating a synthesis route for a third exemplary pentafluorophosphate derivative.

Synthesis and Evaluation of α,α-difluorobenzyl-penta-P-fluorophosphate 13 as Third Exemplary Pentafluorophosphate Derivative FIG. 3 illustrates a reaction scheme of the synthesis of NMe$_4$-α,α-difluorobenzyl-penta-P-fluorophosphate 13 starting from difluorobenzyl phosphonate 12.

Difluorobenzyl phosphonate 12 (460 mg, 2 mmol) and a catalytic amount of dry DMF were dissolved in dry DCM (4 mL). Oxalyl chloride (428.8 µL, 5 mmol, 2.5 eq.) was added dropwise and the mixture heated to 40° C. and stirred for 2 hours at room temperature. The solvent and excess of (COCl)$_2$ were removed under reduced pressure and the residue dissolved in dry ACN. NMe$_4$F (763 mg, 8.2 mmol, 4.1 eq.) was added and the reaction was stirred 16 h at room temperature. The white precipitate was filtrated off, the filtrate was evaporated and purified by RP-MPLC (H$_2$O/ACN, 5-99% ACN). Lyophilization of the product fractions afforded tetramethylammonium (difluoro-(phenyl)-methyl)-penta-P-fluorophosphate 13 as colorless crystals with light brown reflexes. Yield: 140 mg, 21%; m.p. 107° C.; $^1$H NMR (400 MHz, [D6]DMSO): δ=7.55 (d, J=6.3 Hz, 1H), 7.44 (d, J=6.8 Hz, 1H), 7.32 (ddd, J=19.0 Hz, J=10.9 Hz, J=7.3 Hz, 3H), 3.09 (s, 12H, N(CH$_3$)$_4$) ppm; $^{13}$C NMR (101 MHz, [D6]DMSO): δ=129.9, 128.3, 128.2, 127.6, 126.4, 125.7, 54.9 ppm; $^{19}$F NMR (470 MHz, CD$_3$OD): δ=−67.7 (dp, J=700 Hz, J=46 Hz, 1F, F$_{ax}$), −69.9 (ddt, J=858 Hz, J=45 Hz, J=8.6 Hz, 4F, F$_{eq}$), −97.3 (ddt, J=121 Hz, J=17 Hz, J=7.3 Hz, 2F, CF$_2$) ppm; $^{31}$P NMR (162 MHz, [D6]-DMSO): δ=−144 (dtquin, J=858 Hz, J=700 Hz, J=120 Hz) ppm; ESI-HRMS: [M]$^-$ calculated for C$_7$H$_5$F$_7$P$^-$: 253.0023, found: 253.0033 m/z.

Formation of α,α-difluorobenzyl-penta-P-fluorophosphate 13 was confirmed by HPLC-MS analysis displaying very uncommon elution properties both on C8 and C18 reversed phase silica. While the phosphonic acid 12 eluted at 3.4 min on RP-18 material displaying a symmetric peak and a characteristic UV spectrum, compound 13 interacted strongly with the column material, resulting in elution after 9 min at the very end of the default gradient (5 to 95% ACN in water). Additionally, no absorbance of 13 at 210 nm, 254 nm and 290 nm could be observed. These properties hampered chromatographic purifications like reverse phase MPLC. Crystallization of 13 from the product fractions resulted in an overall yield of 21%. Subsequent NMR analysis clearly showed the octahedral coordination around the phosphorus nucleus (FIGS. 4A and 4B).

In accordance with the elution properties on RP-HPLC, the tetramethylammonium α,α-difluorobenzyl pentafluoro phosphate 13 is significantly more lipophilic compared to phosphonate 12, thus being more soluble in acetonitrile than in water.

Figure 4A:
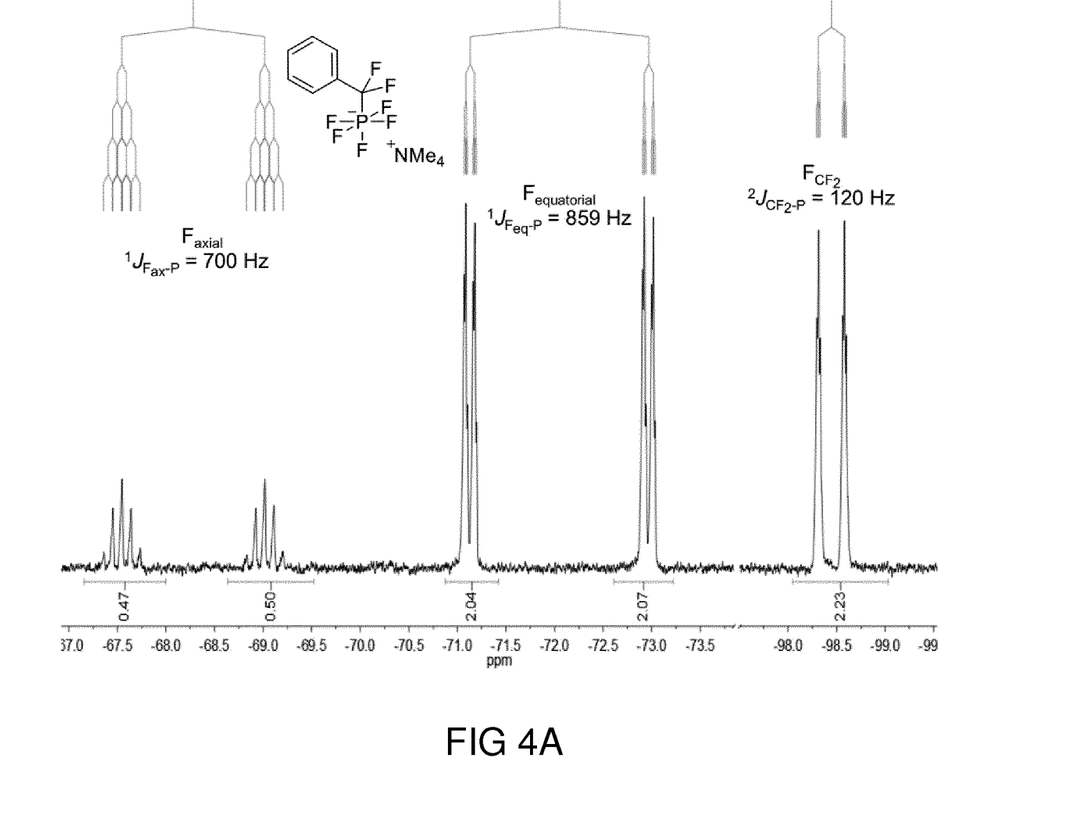
FIG. 4A shows an $^{19}F$ NMR spectrum of the third exemplary pentafluorophosphate derivative recorded in $D_2O$.
Figure 4B:
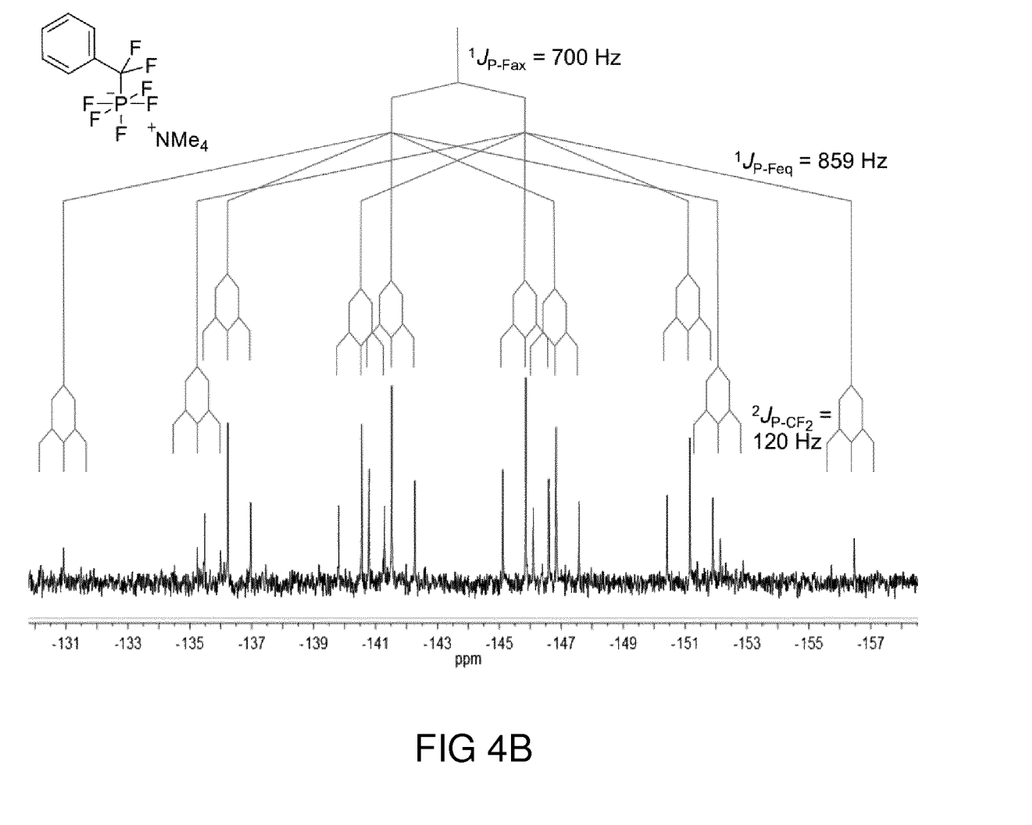
FIG. 4B shows an $^{31}P$ NMR spectrum of the third exemplary pentafluorophosphate derivative recorded in [D6] DMSO.

FIG. 4A shows a $^{19}$F NMR spectrum recorded in D$_2$O. FIG. 4B shows an $^{31}$P NMR spectrum recorded in [D6] DMSO of the pentafluorophosphate 13.

The stability of pentafluorophosphate 13 was investigated over the pH range from 2 to 12 in aqueous solution using $^{19}$F-NMR spectroscopy in D$_2$O and no degradation or hydrolysis could be observed after several hours, also confirming the stability of 13 under physiological buffer conditions. Initial investigations of the inhibitory potential towards the protein tyrosine phosphatase PTP1B showed a significant affinity. In order to enhance the solubility in aqueous systems and to exclude any interfering effects of the counter ion NMe$_4^+$, compound 13 was transferred into its sodium salt 13-Na.

For this purpose, compound 13 was dissolved in water and treated with previously washed sodium-loaded Amberlite® resin. The obtained solution was subsequently eluted several times through syringes filled with the ion exchange resin. Completion of the ion exchange reaction was monitored by $^1$H NMR through the loss of the NMe$_4^+$ signal.

Figure 5A:
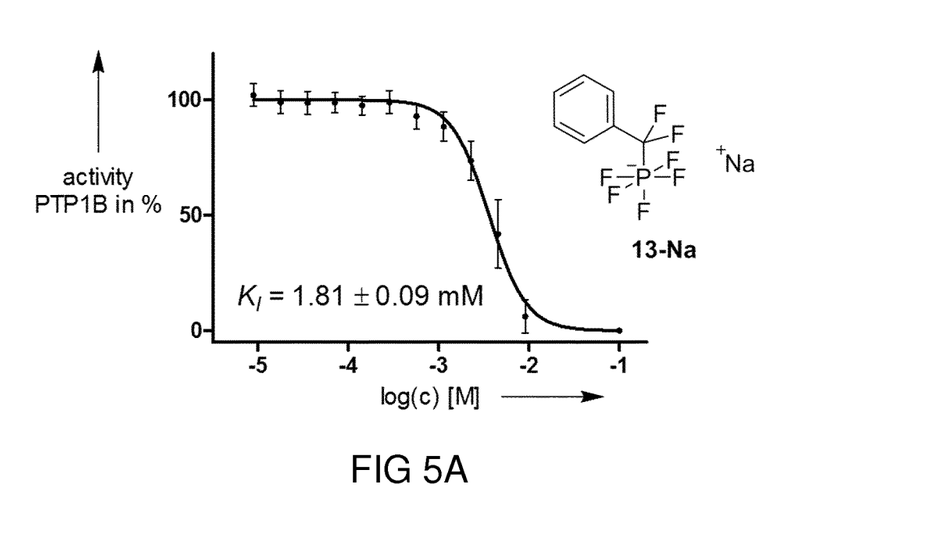
FIG. 5A shows the inhibition of PTP1B at various concentrations of the third exemplary pentafluorophosphate derivative.

While showing the same characteristics during HPLC measurements, ion exchange resulted in an increased solubility of 13-Na in water up to 200 mM without any loss in stability. Using the very same assay, the detection of the chromogenic para-nitrophenolate at 405 nM, an inhibition constant K$_I$ of product fractions from several synthetic batches in a final set of 187 data points was determined to be 1.81 mM (FIG. 5A).

During the measurements of the inhibitory effect of 13-Na, inhibitors with known inhibition constants were used in parallel as positive controls in order to verify the reliability of the assay. The inhibition constant of 1.81 mM indicates more favorable protein-inhibitor interactions of the R—PF$_5^-$ moiety than the phosphonate R—P(O)O$_2^{2-}$ which is present in compound 12 (K$_I$=1.910 mM). Thereby, compound 12 is considered as current gold standard of protein tyrosine phosphatase inhibitors.

The inhibition properties of the novel pentafluorophosphate phosphate derivative were compared with the inhibition properties of other already known compounds:

| Compound | Inhibitory effect on PTP1B in an enzyme assay | Data published | Remark |
| --- | --- | --- | --- |
| Benzyl phosphonic acid | No inhibition | Marseigne, I., and B_P Roques. "Synthesis of new amino acids mimicking sulfated and phosphorylated tyrosine residues." *The Journal of Organic Chemistry* 53.15 (1988): 3621-3624. | Comparative example |
| Fluorobenzyl phosphonic acid | K$_I$ = ca. 5 mM | Kole, H. K., et al. "Phosphonate inhibitors of protein-tyrosine and serine/threonine phosphatases." *Biochemical Journal* 311.3 (1995): 1025-1031. | Comparative example |
| Difluorobenzyl phosphonic acid | K$_I$ = 1.9 mM | Burke Jr, Terrence R., et al. "Preparation of fluoro-and hydroxy-4-(phosphonomethyl)-D, L-phenylalanine suitably protected for solid-phase synthesis of peptides containing hydrolytically stable analogs of O-phosphotyrosine." *The Journal of Organic Chemistry* 58.6 (1993): 1336-1340. | Comparative example |

-continued

| Compound | Inhibitory effect on PTP1B in an enzyme assay | Data published | Remark |
|---|---|---|---|
| Difluorobenzyl-penta-P-fluorophosphate | $K_I = 1.8$ mM | | Novel pentafluoro-phosphate derivative |
| [1,1-difluoro-1-(2-naphthalenyl)-methyl]phosphonic acid | $K_I = 0.179$ mM | T. R. Burke, Jr., B. Ye, X. Yan, S. Wang, Z. Jia, L. Chen, Z. Y. Zhang, D. Barford, Biochemistry 1996, 35, 15989-15996. | Comparative example |
| Difluoro-(naphtha-2-yl)-methyl)-penta-P-fluorophosphate 14 | $K_I = 0.026$ mM | | Novel pentafluoro-phosphate derivative |

Next, these findings should be extended to other pentafluorophosphates.

Difluoro-naphth-2-yl-methylphosphonate (140 mg, 0.500 mmol) and a catalytic amount of dry DMF were dissolved in dry DCM (1 mL). Oxalyl chloride (165.7 μL, 1.25 mmol, 2.5 eq.) was added dropwise, the mixture heated to 40° C. and stirred for 2 hours at room temperature. The solvent and excess of $(COCl)_2$ were removed under reduced pressure and the residue redissolved in dry ACN (0.5 mL). $NMe_4F$ (190.9 mg, 2.05 mmol, 4.1 eq.) was added and the reaction was stirred 16 h at room temperature. After filtration the solvent was removed under reduced pressure and the residue was washed twice with deionized $H_2O$. After drying under reduced pressure, tetramethylammonium (difluoro-(naphtha-2-yl)-methyl)-penta-P-fluorophosphate 14 was obtained as colorless crystals with light brown reflexes. Yield: 11 mg, 6%; m.p. 142° C.; $^1H$ NMR (700 MHz, $CD_3OD/CD_3CN$): δ=7.95 (s, 1H, Ar), 7.90 (dd, J=6.0, J=3.4 Hz, 1H, Ar), 7.87 (dd, J=6.1, J=3.4 Hz, 1H, Ar), 7.83 (d, J=8.7 Hz, 1H, Ar), 7.62 (d, J=8.5 Hz, 1H, Ar), 7.50 (dq, J=6.6, J=3.5 Hz, 2H, Ar), 3.11 (s, 12H, $N(CH_3)_4$) ppm; $^{13}C$ NMR (176 MHz, $CD_3OD/CD_3CN$): δ=133.1, 132.5, 128.0, 127.2, 126.3, 125.8, 125.6, 124.0, 123.9, 116.9 54.9 ppm; $^{19}F$ NMR (376 MHz, $CD_3OD/CD_3CN$): δ=−71.4 (dp, J=696.5, J=43.5 Hz, 1F, $F_{ax}$), −73.1 (ddt, J=860.6, J=44.3, J=8.7 Hz, 4F, $F_{eq}$), −99.7 (dt, J=121.6, J=16.7, J=7.3 Hz, 2F, $CF_2$) ppm; $^{31}P$ NMR (162 MHz, $CD_3OD/CD_3CN$): δ=−143.2 (dtquin, J=860.5 Hz, J=695.9 Hz, J=121.7 Hz) ppm; ESI-HRMS: $[M]^-$ calculated for $C_{11}H_7F_7P^-$: 303.0179, found: 303.01772 m/z.

Compound 14 was dissolved in methanol and treated with previously washed sodium-loaded Amberlite® resin. The obtained solution was subsequently eluted several times through syringes filled with the ion exchange resin. Completion of the ion exchange reaction was monitored by $^1H$ NMR through the loss of the $NMe_4^+$ signal.

The obtained product 14-Na (cf. FIG. 5B) was stable and well soluble in the used biochemical buffer. The $K_I$ of 14-Na was determined to be as low as 0.026 mM.

Figure 5B:
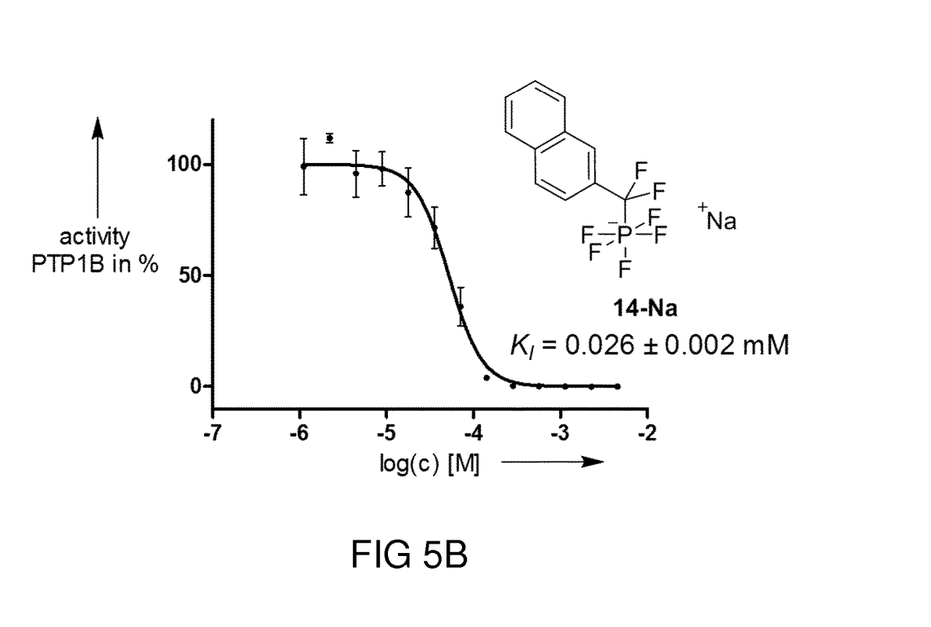
FIG. 5B shows the inhibition of PTP1B at various concentrations of a forth exemplary pentafluorophosphate derivative.

FIG. 5A shows the Inhibition of PTP1B at various concentrations of 13-Na. FIG. 5B shows the Inhibition of PTP1B at various concentrations of 14-Na. In case of 13-Na a data point with 100% inhibition was added at 100 mM concentration without altering the calculated $K_I$ values.

These results corroborate that difluoro-methyl-pentafluorophosphate fragments are indeed bioisosters and biomimetics of phosphate residues.

According to a molecular model, binding of compound 13 to the active site of PTPB1 was accomplished by H-bonds from Cys215, Ser216, Ile219, Gly220, and Arg221. Moreover, the protonated side chain of Arg221 was involved in charge interactions, and Tyr46, Val49, and Phe182 contributed to hydrophobic interactions.

Summarizing, difluoro-benzyl-penta-P-fluorophosphate 13 was found to be a stable compound in aqueous solutions over a broad pH range. Penta-P-fluorophosphate 13 was established as a novel phosphotyrosine mimetic and identified as a reversible inhibitor of the protein tyrosine phosphatase PTP1B with an affinity better than the current "gold standard", i.e., the reference compound α,α-difluoro-benzyl phosphonate 12. Pentafluorophosphate derivative 14-Na was found to be an even more potent inhibitor of PTP1B.

The invention claimed is:

1. A pentafluorophosphate derivative according to general formula (I):

or to a pharmaceutically acceptable salt or solvate thereof, wherein
$R^1$ and $R^2$ denote,
$R^3$ denotes H,
a $C_1$-$C_{10}$ alkyl optionally substituted by a hydrocarbon chain comprising an amide function and/or a carboxyl function, or by a substituent chosen from the group consisting of alkyl, alkylamino, alkylaminocarboxy, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo,
an optionally substituted $C_3$-$C_{10}$ cycloalkyl, or
an optionally substituted $C_6$-$C_{20}$ aryl,
wherein a hydrocarbon chain of the alkyl, the cycloalkyl or the aryl can be interrupted by one or more oxygen, sulfur and/or nitrogen atoms, and
M denotes any cation.

2. The pentafluorophosphate derivative according to claim 1, wherein the cycloalkyl or the aryl is substituted by a hydrocarbon chain comprising an amide function and/or a carboxyl function, or by a substituent chosen from the group consisting of alkyl, alkylamino, alkylaminocarboxy, halogen, haloalkyl, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo.

3. The pentafluorophosphate derivative according to claim 1, wherein it corresponds to general formula (II):

(II)

or to a pharmaceutically acceptable salt or solvate thereof, wherein $R^4$, $R^5$, $R^6$, $R^7$, $R^8$ denote independently from each other H, an optionally substituted $C_1$-$C_{10}$ alkyl, an optionally substituted $C_3$-$C_{10}$ cycloalkyl, or an optionally substituted $C_6$-$C_{20}$ aryl, wherein a hydrocarbon chain of the alkyl, the cycloalkyl or the aryl can be interrupted by one or more oxygen, sulfur and/or nitrogen atoms.

4. The pentafluorophosphate derivative according to claim 3, wherein the alkyl, the cycloalkyl or the aryl is substituted by a hydrocarbon chain comprising an amide function and/or a carboxyl function, or by a substituent chosen from the group consisting of alkyl, alkylamino, alkylaminocarboxy, halogen, haloalkyl, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo.

5. The pentafluorophosphate derivative according to claim 1, wherein it corresponds to general formula (III):

(III)

or to a pharmaceutically acceptable salt or solvate thereof, wherein $R^9$ denotes H or a protective group.

6. The pentafluorophosphate derivative according to claim 1, wherein $R^3$ denotes H.

7. A pharmaceutical composition, comprising a pentafluorophosphate derivative according to claim 1 as active compound.

8. A method for manufacturing a pentafluorophosphate derivative according to claim 1, comprising the following steps:
a) converting a diethyl phosphonate derivative according to general formula (IV) into a sodium phosphonate derivative according to general formula (V), and
b) fluorinating the sodium phosphonate derivative according to general formula (V) to obtain the pentafluorophosphate derivative according to general formula (I)

wherein
$R^1$ and $R^2$ denote,
$R^3$ denotes H,
a $C_1$-$C_{10}$ alkyl optionally substituted by a hydrocarbon chain comprising an amide function and/or a carboxyl function, or by a substituent chosen from the group consisting of alkyl, alkylamino, alkylaminocarboxy, carboxy, alkoxycarbonyl, hydroxy, N-morpholino, N-morpholinoalkyl, N-morpholinocarbonyl, N-methyl-N-piperazinyl, N-methyl-N-piperazinylalkyl, N-methyl-N-piperazinylcarbonyl, and sulfo,
an optionally substituted $C_3$-$C_{10}$ cycloalkyl, or
an optionally substituted $C_6$-$C_{20}$ aryl,
wherein a hydrocarbon chain of the alkyl, the cycloalkyl or the aryl can be interrupted by one or more oxygen, sulfur and/or nitrogen atoms, and M denotes any cation.

9. The method according to claim 8, wherein step a) is carried out by reacting the diethyl phosphonate derivative with bromotrimethylsilane in an organic solvent and by purifying the resulting product with an ion-exchange resin.

10. The method according to claim 8, wherein step b) is carried out by reacting the product resulting from step a) with oxalyl chloride and by reacting the resulting product with a fluorinating reagent.

11. The method according to claim 10, wherein the fluorinating reagent is at least one chosen from the group consisting of quaternary ammonium fluorides and alkali metal fluorides.

* * * * *